United States Patent [19]

O'Bryan

[11] Patent Number: 5,675,228

[45] Date of Patent: Oct. 7, 1997

[54] METHODS AND APPARATUS FOR CONTROLLING ENERGIZATION OF A MOTOR

[75] Inventor: James Edward O'Bryan, Fort Wayne, Ind.

[73] Assignee: General Electric Company, Fort Wayne, Ind.

[21] Appl. No.: 575,558

[22] Filed: Dec. 18, 1995

[51] Int. Cl.$^6$ .................................................. B02C 23/04
[52] U.S. Cl. ..................... 318/453; 388/917; 388/936; 83/DIG. 1; 99/492; 200/43.09; 241/37.5
[58] Field of Search ................................. 388/917, 936, 388/903; 318/452, 453; 83/DIG. 1; 99/486, 492; 200/43.01, 43.09, 43.22; 241/33, 37.5

[56] References Cited

U.S. PATENT DOCUMENTS

| | | |
|---|---|---|
| 3,892,365 | 7/1975 | Verdun . |
| 4,153,210 | 5/1979 | Schaeffer . |
| 4,329,757 | 5/1982 | Ramstrom et al. . |
| 4,543,723 | 10/1985 | Bortfeld et al. . |
| 5,454,299 | 10/1995 | Gonneaud . |
| 5,455,735 | 10/1995 | Zerega . |
| 5,486,665 | 1/1996 | Le Rouzic . |

OTHER PUBLICATIONS

General Electric "SCR Manual Sixth Edition", prepared by Application Engineering Centers, Auburn, New York and Paris, France, 1979, pp. 188–191.
Declaration of James E. O'Bryan.

*Primary Examiner*—Bentsu Ro
*Attorney, Agent, or Firm*—Ralph E. Krisher, Jr.

[57] ABSTRACT

Methods and apparatus for controlling energization of an appliance motor are described. The apparatus, in one embodiment, may include a condition responsive switch secured within an appliance motor casing to control the energization of the appliance motor windings. In one mode of operation, the condition responsive switch substantially prevents energization of the motor windings if at least one attachment has not been substantially properly secured to the appliance, and the switch substantially properly secured to the appliance.

12 Claims, 2 Drawing Sheets

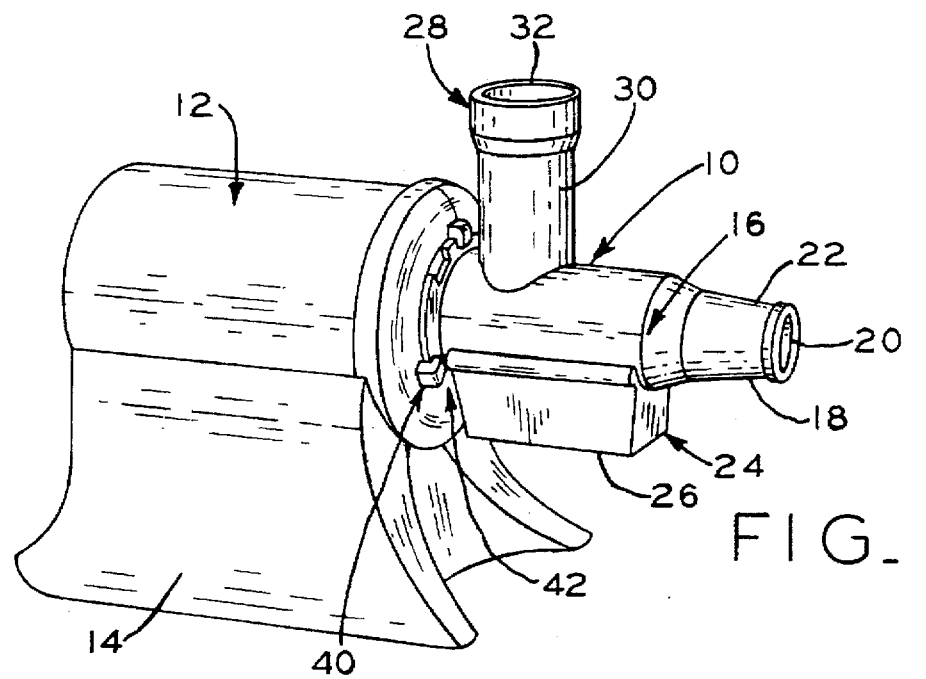
FIG_1
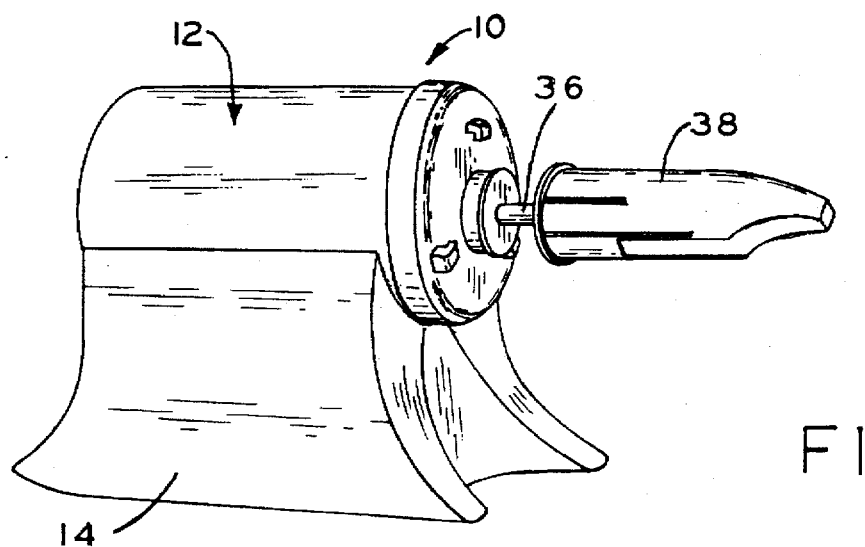
FIG_3
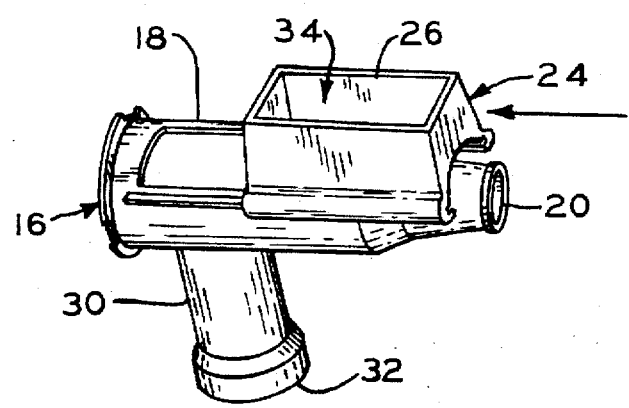
FIG_2

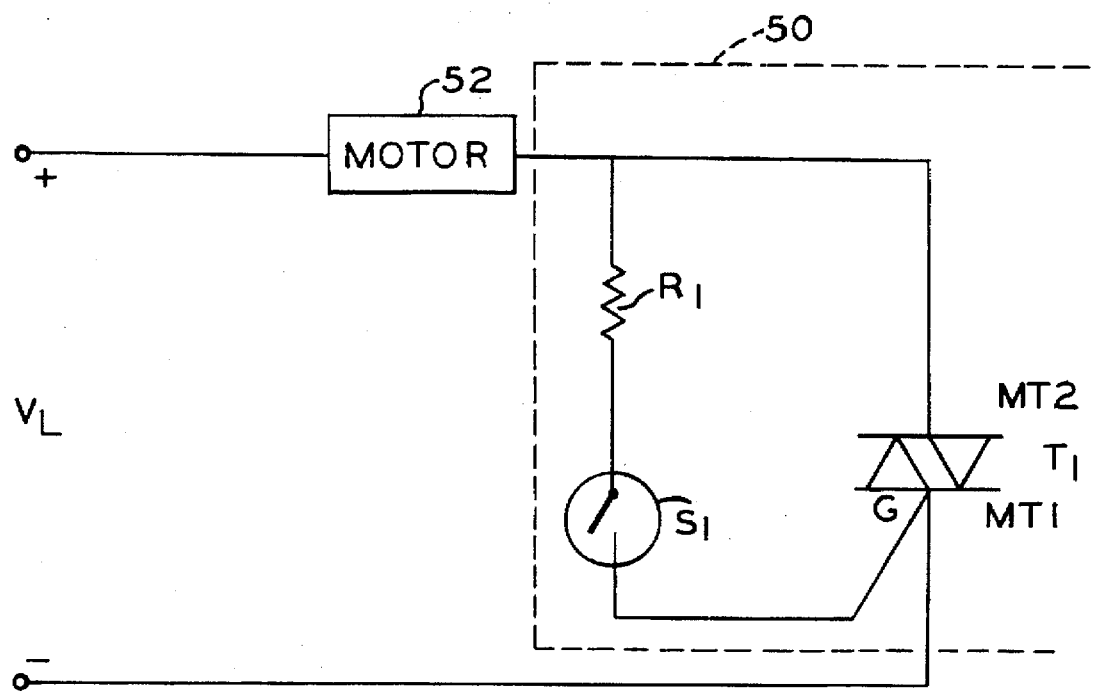
FIG_4
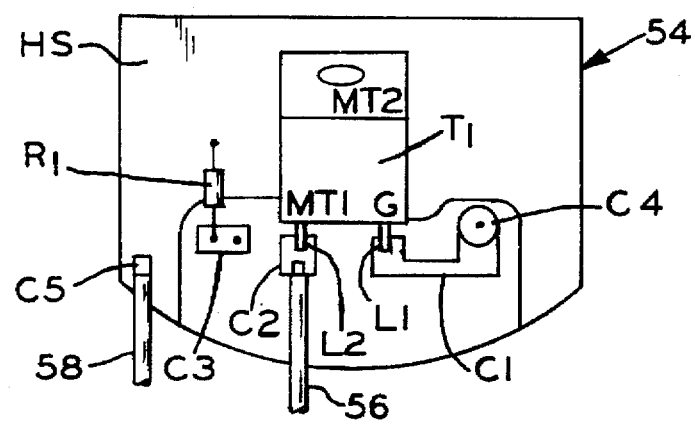
FIG_5

METHODS AND APPARATUS FOR CONTROLLING ENERGIZATION OF A MOTOR

FIELD OF THE INVENTION

The present invention relates generally to motors and, more particularly, to methods and apparatus for controlling energization of an appliance motor.

BACKGROUND OF THE INVENTION

Appliances typically include safety attachments which, when properly secured to the appliance, may protect an appliance operator and others from being injured by the appliance. For example, some appliances such as juicers may have rotating cutting blades for grating or masticating a vegetable or fruit. An appliance cover substantially encloses the blades, but the cover may have an outlet so that in certain modes of operation, the processed vegetable or fruit can be ejected from the appliance through the outlet and collected in a cup placed below the outlet. The cutting blades may be at least partially exposed at the location of the outlet, and during operation, if an individual places a hand or finger in the outlet, the individual could be seriously injured by the rotating cutting blades.

In an attempt to prevent individuals from accidentally contacting the cutting blades of a juicer, a safety attachment may be provided with the juicer. When properly secured to the juicer, at least one known juicer safety attachment forms a shroud around the outlet. The shroud may facilitate preventing an individual from accidentally contacting the cutting blades.

Although such safety attachments may be helpful in reducing accidents, some operators may ignore the safety attachment instructions and attempt to use an appliance without a recommended safety attachment. Also, other operators may attempt to use a safety attachment, but may not secure such attachment to an appliance in a proper manner. In circumstances in which the safety attachment is not properly secured, since the operator may attempt to adjust the attachment during operation of the appliance, the likelihood of injury may possibly even be increased.

Accordingly, it would be desirable to provide an appliance control that prevents operation of an appliance unless and until a safety attachment has been properly secured to the appliance. It would also be desirable and advantageous to provide such a control which is inexpensive, in terms of both material and labor, to manufacture and assemble.

An object of the present invention is to provide a control which substantially prevents the energization of an appliance motor if an appliance attachment is not properly secured thereto.

Another object of the present invention is to provide such a control which is inexpensive to manufacture and assemble.

Still another object of the present invention is to provide a motor control for an appliance which facilitates preventing an operator and others from being injured by the appliance.

Yet another object of the present invention is to provide such a control for a juicer which prevents energization of the juicer motor when a safety attachment is not properly secured to the juicer cover.

SUMMARY OF THE INVENTION

These and other objects may be attained with methods and apparatus for controlling energization of an appliance motor.

The apparatus, in one embodiment, may be secured within an appliance motor casing to control the energization of the appliance motor and may include a magnet actuated, normally open reed switch coupled, at one end, to the gate of a triac. The triac may be coupled in series circuit with the appliance motor. The triac may prevent energization of the motor windings when the gate signal supplied from the reed switch is low, e.g., 0 volts, and may allow energization of the motor windings when the gate signal supplied from the reed switch is high, e.g., 5 volts.

With respect to a juicer, and in one embodiment of the apparatus, a magnet may be secured to a screen holder which forms a shroud that when properly secured to the juicer cover, surrounds an outlet in the cover. The magnet may be positioned so that when the screen holder is properly secured to the juicer cover, the magnet affects the state of the reed switch, i.e., the reed switch transitions from its normally open condition to a closed condition. If the screen holder is not so properly secured to the juicer cover, or is not secured to the cover at all, the reed switch is substantially unaffected and remains in its normally open state.

Prior to operation, and once the screen holder is properly secured to the juicer cover, the magnetic forces from the magnet secured to the screen holder may cause the reed switch to close. When the reed switch is closed, and when the appliance power switch is closed, the triac gate signal supplied from the reed switch may be high and the motor windings may be energized.

If an operator attempts to operate the juicer without the screen holder properly secured to the juicer, or attempts to remove the screen holder during operation, the reed switch may remain in, or switch to, its normally open configuration. As a result, the triac gate signal supplied from the reed switch may remain in, or may transition to, a low state. When the triac gate signal is low, the appliance motor windings may not be energized, or if the motor windings are energized when the triac gate signal transitions to the low state, the motor windings may be de-energized.

The method and apparatus described above substantially prevent energization of appliance motor windings unless and until a safety attachment has been properly secured to the appliance. Such a result facilitates reducing the risk of injuries. In addition, in at least one embodiment, the apparatus is inexpensive to manufacture and assemble.

BRIEF DESCRIPTION OF THE DRAWINGS

FIG. 1 is a perspective view of a known juicer appliance including a screen holder.

FIG. 2 is a perspective view of the screen holder and cover for the juicer shown in FIG. 1 with parts cut away.

FIG. 3 is a perspective view of the juicer shown in FIG. 1 with certain parts cut away.

FIG. 4 is a schematic diagram illustrating a control apparatus connected in series circuit with a motor.

FIG. 5 is a plan view of a circuit board implementing the control apparatus illustrated in schematic form in FIG. 4.

DETAILED DESCRIPTION OF THE DRAWINGS

FIG. 1 is a perspective view of a juicer 10 which is commercially available from Plastaket Manufacturing Company, 6220 E. Highway 12, Lodi, Calif., 95240. Juicer 10 includes a motor casing 12 and a one-third horsepower motor, for example, is secured within casing 12. Motor casing 12 is mounted on a stand 14.

A blade cover 16 is removably secured to casing 12 and includes a substantially cylindrical body portion 18 having a pulp opening 20 at a tapered end 22. A sliding screen holder 24 is removably secured to cover 16, and screen holder 24 forms a shroud 26 that surrounds an outlet (not shown in FIG. 1) in cover 16. Holder 24, depending upon the mode of operation, may hold process-aiding components such as a screen or a blank in an operative position with respect to the outlet. A feeder 28 is integrally formed with cover 16 and includes a throat portion 30 having an open end 32.

FIG. 2 is a perspective view of cover 16 and screen holder 24, with parts cut away. As clearly shown in FIG. 2, screen holder 24 forms shroud 26 that is slidably engaged to cylindrical body portion 18. In one mode of operation, a process-aiding component is not secured by holder 24 and grated vegetables or fruit may pass through an opening 34 in cover 16 and through shroud 26 to a cup placed below shroud 26.

As shown in FIG. 3, a shaft 36 driven by the appliance motor extends through motor casing 12. A cylindrical cutter 38 having cutting blades is secured to shaft 36. Cutter 38 extends within, and substantially the entire length of, cylindrical body portion 18 of cover 16 (not shown in FIG. 3).

To operate juicer 10, fruit or vegetables are loaded into feeder 28 and tamped down into contact with cutter 38. The juicer motor is energized and shaft 36 begins to rotate. Cutter 38 rotates with shaft 36, and cutter 38 grates or masticates the fruit or vegetable. The resulting grated fruit or vegetable, or fluid, passes through opening 34 into, for example, a cup placed below screen holder 24.

As explained above, for the grating mode of operation, no attachment is held by screen holder 24. Therefore, even though the instructions accompanying juicer 10 may instruct an operator to attach screen holder 24 to cover 16 so that shroud 26 may prevent injury, the operator may ignore the instruction and not use screen holder 24. If screen holder 24 is not used, the cutting blades of cutter 38 may be exposed. For other modes of operation, a screen (not shown) may be held by holder 24 in opening 34 to prevent pulp from passing through outlet 34. The pulp preferably is ejected from pulp opening 20.

In all modes of operation, shroud 26 of screen holder 24 may prevent an operator or others from accidentally contacting cutter 38 by at least partially blocking outlet 34 in cover 16. For example, shroud 26 may prevent an operator from accidentally coming into contact with cutter 38 when placing a collection cup below outlet 34. If screen holder 24 is removed, or if holder 24 is not properly secured, it is desirable to prevent cutter 38 from operating since an operator or others may be more likely to come into contact with cutter 38 under such conditions.

One embodiment of a control apparatus 50 which attains these and other objects is illustrated in circuit schematic form in FIG. 4. Apparatus 50 may be utilized to control the energization of an appliance motor 52 to achieve the desired results and may generally be characterized as a condition responsive switch. Of course, control apparatus 50 can be implemented using components other than the specific components illustrated schematically in FIG. 4. It should be understood, therefore, that the circuit schematic shown in FIG. 4 represents one embodiment of an apparatus which provides the desired results, and other embodiments are possible.

Particularly referring to the circuit schematic illustrated in FIG. 4, control apparatus 50 includes a triac $T_1$ coupled in series circuit with the windings of motor 52 and an energy source supplying a line voltage $V_L$. A gate G of triac $T_1$ is coupled to a switch $S_1$. Switch $S_1$ is connected in series circuit with a resistor $R_1$ which is coupled to motor 52. Switch $S_1$ is normally open. A power switch (not shown) typically is in series circuit with motor 52 and could be schematically illustrated as connected in series circuit with, and between, motor 52 and positive power terminal "+".

Resistor $R_1$ may, for example, be a 100 ohm, ¼ watt resistor. Switch $S_1$ may be a magnetic responsive reed switch such as one commercially available from Hamlin, Inc., 612 East Lake Street, Lake Mills, Wis. 53507. Triac $T_1$ may be, for example, a Motorola MAC223A6, 25 ampere, 400 volt triac.

In the configuration illustrated in FIG. 4, when the signal supplied by switch $S_1$ at gate G of triac $T_1$ is low, e.g., 0 volts, triac $T_1$ prevents current flow therethrough. When the signal supplied by switch $S_1$ at gate G of triac $T_1$ is high, e.g., 5 volts, triac $T_1$ allows current flow therethrough.

FIG. 5 illustrates one embodiment of a circuit board 54 implementing control apparatus 50. More particularly, circuit board 54 includes triac $T_1$ having two terminals MT1 and MT2. A first lead L1 extends from gate G of triac $T_1$ and is connected to a connector C1. A second lead L2 extends from terminal MT1 to a connector C2. A line lead 56 is electrically connected to converter C2. One lead of resistor $R_1$ is connected to a connector C3. The other lead of resistor $R_1$ is connected to a copper heat sink HS.

On the opposite surface of board 54, which is not shown in FIG. 5, one lead of reed switch $S_1$ (not shown) is connected to connector C1 at a connection C4 and the other lead of switch $S_1$ is connected to connector C3. A motor lead 58 is connected to copper heat sink HS at a connector C5.

In the one embodiment illustrated in FIG. 5, circuit board 54 is mounted within motor casing 12 of juicer 10 at a location generally indicated by the arrow associated with reference numeral 40 in FIG. 1. Board 54 is mounted using an adhesive and secured so that switch $S_1$ faces outward towards screen holder 24. In addition, a reed switch actuating magnet (not shown) is secured, using an adhesive, to shroud 26 at a location generally indicated by the arrow associated with reference numeral 42 in FIG. 1.

By arranging board 54 and the actuating magnet as explained above, and in operation, switch $S_1$ is open when cover 16 and screen holder 24 are not properly secured with respect to casing 12. When switch $S_1$ is open, and as explained above, the signal supplied by switch $S_1$ at gate G of triac $T_1$ is low. Therefore, regardless of the state of the appliance power switch, appliance motor 52 will not be energized under such conditions.

When cover 16 and screen holder 24 are properly secured with respect to casing 12, the magnetic forces of the actuating magnet secured to shroud 26 couple with reed switch $S_1$ and cause reed switch $S_1$ to transition from its normally open condition to a closed condition. When reed switch $S_1$ is closed, and the appliance power switch is closed, the signal supplied by switch $S_1$ at gate G of triac $T_1$ is high. Under such conditions, appliance motor 52 is energized.

If an operator attempts to operate juicer 10 without screen holder 24, or attempts to remove screen holder 24 during operation, reed switch $S_1$ will remain in, or switch to, its normally open configuration. As a result, the signal supplied by switch $S_1$ at gate G of triac $T_1$ is low, and regardless of the state of the power switch, motor 52 is not energized, or is de-energized. Such a result facilitates reducing injury to an operator or others by substantially preventing operation of motor 52, and rotation of cutter 38 (FIG. 3), under such conditions.

The magnetic strength of the magnet secured to shroud 26 and the switching sensitivity of switch $S_1$ may be selected so that switch $S_1$ transitions from its normally open condition to a closed condition only when screen holder 24 is located in a predetermined position or range. The specific orientation of board 54 and the magnet, and the sensitivity of switch $S_1$, may be selected and vary depending upon the specific application and desired operating result. Control board 54 could, of course, be utilized in connection with many other appliances and attachment types.

Control apparatus 50, when implemented in accordance with the embodiment shown in FIG. 5, is inexpensive to manufacture and assemble. Moreover, as explained above, it is contemplated that circuit components other than the specific components illustrated in FIGS. 4 and 5 could be utilized for control apparatus 50. For example, other types of switches responsive to effects other than magnetic forces, such as optical signals, could be used for switch $S_1$. For an optical sensor type switch, a light emitting diode (LED) could be secured to shroud 26, and conducting contacts between an energy source and such LED could provide that the LED is energized only when shroud 26 is oriented with respect to casing 12 in a desired position. When the LED is energized and emits light, switch $S_1$ would transition to a closed state. Of course, if switch $S_1$ is optics based and is located within casing 12, an opening would have to be made in casing 12 so that light signals could be transmitted thereto. Also, integrated logic circuits or separate transistors could be used rather than triac $T_1$.

From the preceding description, it is evident that the objects of the invention are attained. Although certain embodiments have been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. Control apparatus for controlling the energization of a motor of a juicer having a motor casing substantially enclosing the motor a rotor shaft extending from the motor through the motor casing and having a cutter secured thereto the cutter being substantially enclosed within a cover having an outlet, an appliance attachment including a shroud configured to be secured to the cover so that the shroud substantially surrounds the outlet, and a magnet secured to the attachment, said apparatus comprising a condition responsive switch which substantially prevents energization of the motor until at least one predetermined condition has been satisfied, one predetermined condition being that the appliance attachment be substantially properly secured to the juicer, said condition responsive switch comprising a magnet actuated switch mounted with respect to the motor casing so that when the shroud and cover are substantially properly secured with respect to the motor casing, said magnet actuated switch transitions from a first state to a second state.

2. Control apparatus in accordance with claim 1 wherein said condition responsive switch comprises a triac configured to be coupled in series circuit with the motor and an appliance energy source.

3. Control apparatus in accordance with claim 2 wherein said triac comprises a gate, a signal supplied to said gate controlling whether said triac is in a substantially conductive state.

4. Control apparatus in accordance with claim 3 wherein said magnet actuated switch is coupled to said triac gate.

5. A method for controlling the energization of a motor of a juicer having a motor casing substantially enclosing the motor, a rotor shaft extending from the motor through the motor casing and having a cutter secured thereto, the cutter being substantially enclosed within a cover having an outlet, the attachment including a shroud configured to be secured to the cover so that the shroud substantially surrounds the outlet, said method comprising the steps of:

substantially preventing energization of the motor if the attachment has not been substantially properly secured to the juicer; and substantially allowing energization of the motor if the attachment has been substantially properly secured to the juicer, said step of substantially allowing energization of the motor comprising the step of causing a condition responsive switch to transition to a substantially conductive state when the shroud and cover are substantially properly secured with respect to the motor casing.

6. A method in accordance with claim 5 wherein the step of substantially preventing energization of the motor comprises the step of causing the condition responsive switch to transition to, or remain in, a substantially non-conductive state when the shroud and cover are not substantially properly secured with respect to the motor casing.

7. A motor for a juicer having a motor casing for substantially enclosing said motor, said motor comprising motor windings and control apparatus for controlling the energization of said motor windings, said control apparatus comprising a condition responsive switch which substantially prevents energization of said motor windings until at least one predetermined condition has been satisfied, one predetermined condition being that an appliance attachment be substantially properly secured to the juicer, said motor further comprising a rotor shaft extending from said motor through the motor casing and having a cutter secured thereto, the cutter being substantially enclosed within a cover having an outlet, the appliance attachment including a shroud configured to be secured to the cover so that the shroud substantially surrounds the outlet, a magnet secured to the attachment, and wherein said condition responsive switch comprises a magnet actuated switch mounted with respect to the motor casing so that when the shroud and cover are substantially properly secured with respect to the motor casing, said magnet actuated switch transitions from a first state to a second state.

8. A motor in accordance with claim 7 wherein said condition responsive switch comprises a triac coupled in series circuit with said motor windings, said triac comprising a gate, a signal supplied to said gate controlling whether said triac is in a substantially conductive state.

9. A motor in accordance with claim 8 wherein said magnet actuated switch is coupled to said triac gate.

10. A juicer comprising a motor and a control apparatus for controlling the energization of said motor, said control apparatus comprising a condition responsive switch which substantially prevents energization of said motor until at least one predetermined condition has been satisfied, one predetermined condition being that a juicer attachment be substantially properly secured to said juicer, said juicer further comprising a motor casing substantially enclosing said motor, a rotor shaft extending from said motor through said motor casing and having a cutter secured thereto, said cutter substantially enclosed within a cover having an outlet, said juicer attachment including a shroud configured to be secured to said cover so that said shroud substantially surrounds said outlet, a magnet secured to said shroud, said condition responsive switch further comprising a magnet actuated switch mounted with respect to said motor casing so that when said attachment is substantially properly secured with respect to said motor casing, said magnet actuated switch transitions from a first state to a second state.

11. A juicer in accordance with claim 10 wherein said condition responsive switch comprises a triac coupled in series circuit with said motor, said triac comprises a gate, the status of a signal supplied to said gate controlling whether said triac is in a substantially conductive state.

12. A juicer in accordance with claim 11 wherein said magnet actuated switch is coupled to said triac gate.

* * * * *